United States Patent
Kim

(10) Patent No.: US 7,917,586 B2
(45) Date of Patent: Mar. 29, 2011

(54) METHOD AND APPARATUS TO FORWARD A MULTIMEDIA MESSAGE

(75) Inventor: Jong-Tak Kim, Gyeonggi-Do (KR)

(73) Assignee: LG Electronics, Inc., Seoul (KR)

( * ) Notice: Subject to any disclaimer, the term of this patent is extended or adjusted under 35 U.S.C. 154(b) by 1022 days.

(21) Appl. No.: 10/726,648

(22) Filed: Dec. 4, 2003

(65) Prior Publication Data

US 2004/0111481 A1 Jun. 10, 2004

(30) Foreign Application Priority Data

Dec. 9, 2002 (KR) .................. 10-2002-0077988

(51) Int. Cl.
*G06F 15/16* (2006.01)
(52) U.S. Cl. ........ 709/206; 709/203; 709/205; 709/231
(58) Field of Classification Search .................. 709/206, 709/231, 205, 203
See application file for complete search history.

(56) References Cited

U.S. PATENT DOCUMENTS

| | | | | |
|---|---|---|---|---|
| 5,703,655 A | * | 12/1997 | Corey et al. | 348/468 |
| 5,768,513 A | * | 6/1998 | Kuthyar et al. | 709/204 |
| 5,819,261 A | * | 10/1998 | Takahashi et al. | 707/3 |
| 5,828,809 A | * | 10/1998 | Chang et al. | 386/69 |
| 6,784,899 B1 | * | 8/2004 | Barrus et al. | 715/717 |
| 6,789,088 B1 | * | 9/2004 | Lee et al. | 707/104.1 |
| 6,816,887 B1 | * | 11/2004 | Shaw et al. | 709/207 |
| 7,072,901 B2 | * | 7/2006 | Teraguchi et al. | 707/102 |
| 2004/0139157 A1 | * | 7/2004 | Neely et al. | 709/205 |
| 2005/0229092 A1 | * | 10/2005 | Hull et al. | 715/500 |

FOREIGN PATENT DOCUMENTS

| | | |
|---|---|---|
| JP | 2002-007290 | 1/2002 |
| KR | 1020000059233 | 10/2000 |
| KR | 1020000063163 | 11/2000 |

OTHER PUBLICATIONS

Japanese Office Action dated Aug. 31, 2006.
Office Action dated Oct. 14, 2005 in Chinese Patent Application No. 200310122573.3.
3GPP TS 23.140, V4.2.0 (Mar. 2001), $3^{rd}$ Generation Partnership Project; Technical Specification Group Terminals; Multimedia Messaging Service (MMS); Function description; Stage 2, pp. 1-54.
"Universal Mobile Telecommunications System (UMTS); Multimedia Messaging Service (MMS), Functional description; Stage 2 (3GPP TS 23.140 version 4.2.0 Release 4)" ETSI TS 123 140 V4.2.0 Mar. 2001.
Crispin M. "Internet message Access Protocol—Version 4rev1," Internet Engineering Task Force, Request for Comments 2060, Dec. 1996.
European Office Action dated Jun. 11, 2010.
3GPP TS 23.140, V5.4.0 (Sep. 2002), $3^{rd}$ Generation Partnership Project; Technical Specification Group Terminals; Multimedia Messaging Service (MMS); Functional description; Stage 2, (Release 5) pp. 1-164.

* cited by examiner

*Primary Examiner* — William C Vaughn, Jr.
*Assistant Examiner* — Umar Cheema
(74) *Attorney, Agent, or Firm* — Ked & Associates, LLP

(57) ABSTRACT

A method and apparatus are provided for handling a multimedia message in order to reduce radio resources and unnecessary forwarding time. This may include setting an index value in a multimedia message and forwarding the multimedia message based on the set index value.

24 Claims, 3 Drawing Sheets

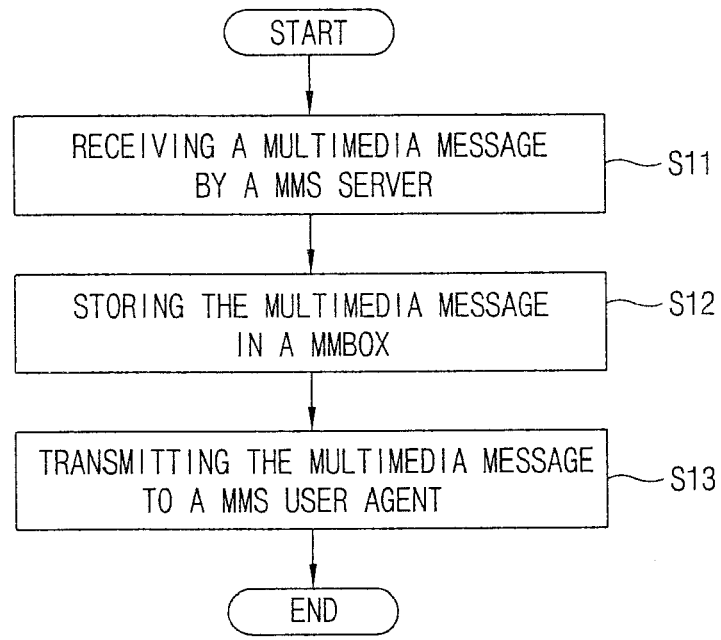
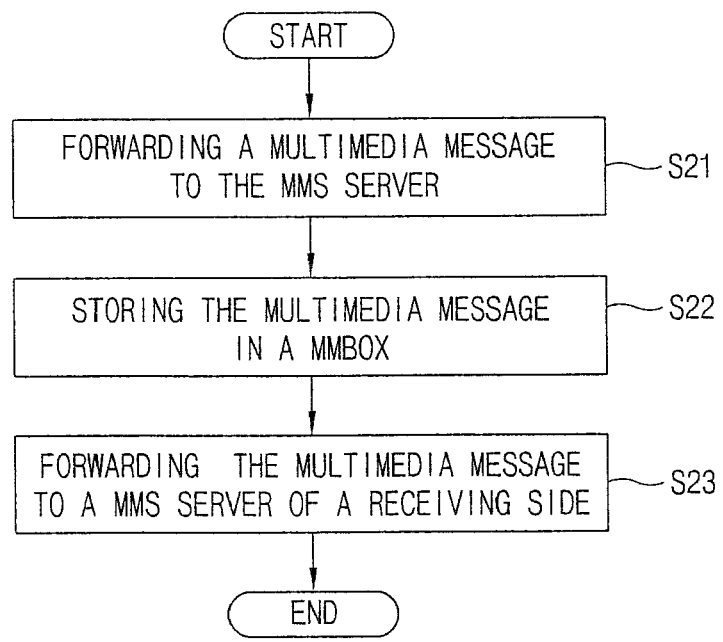

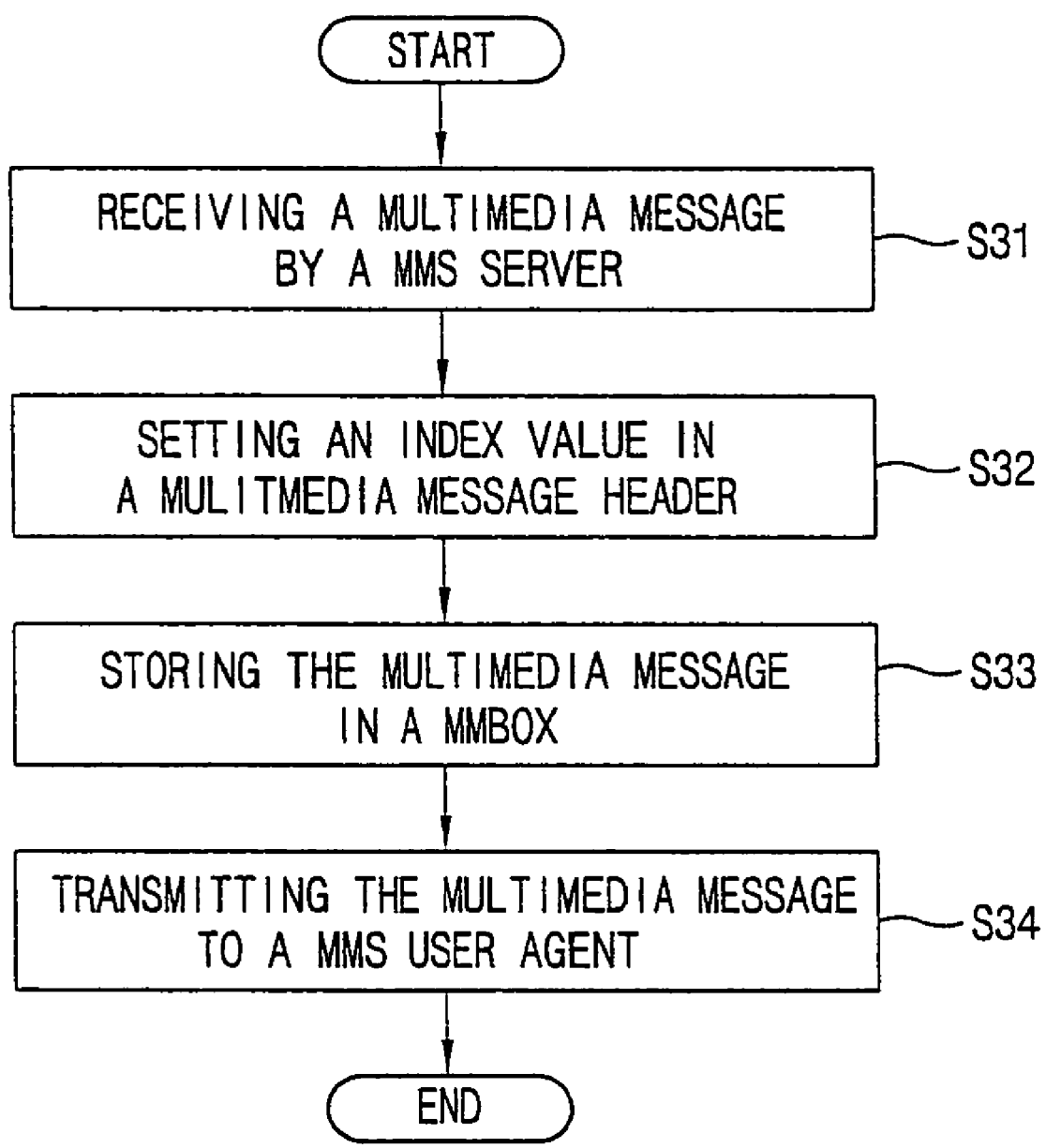

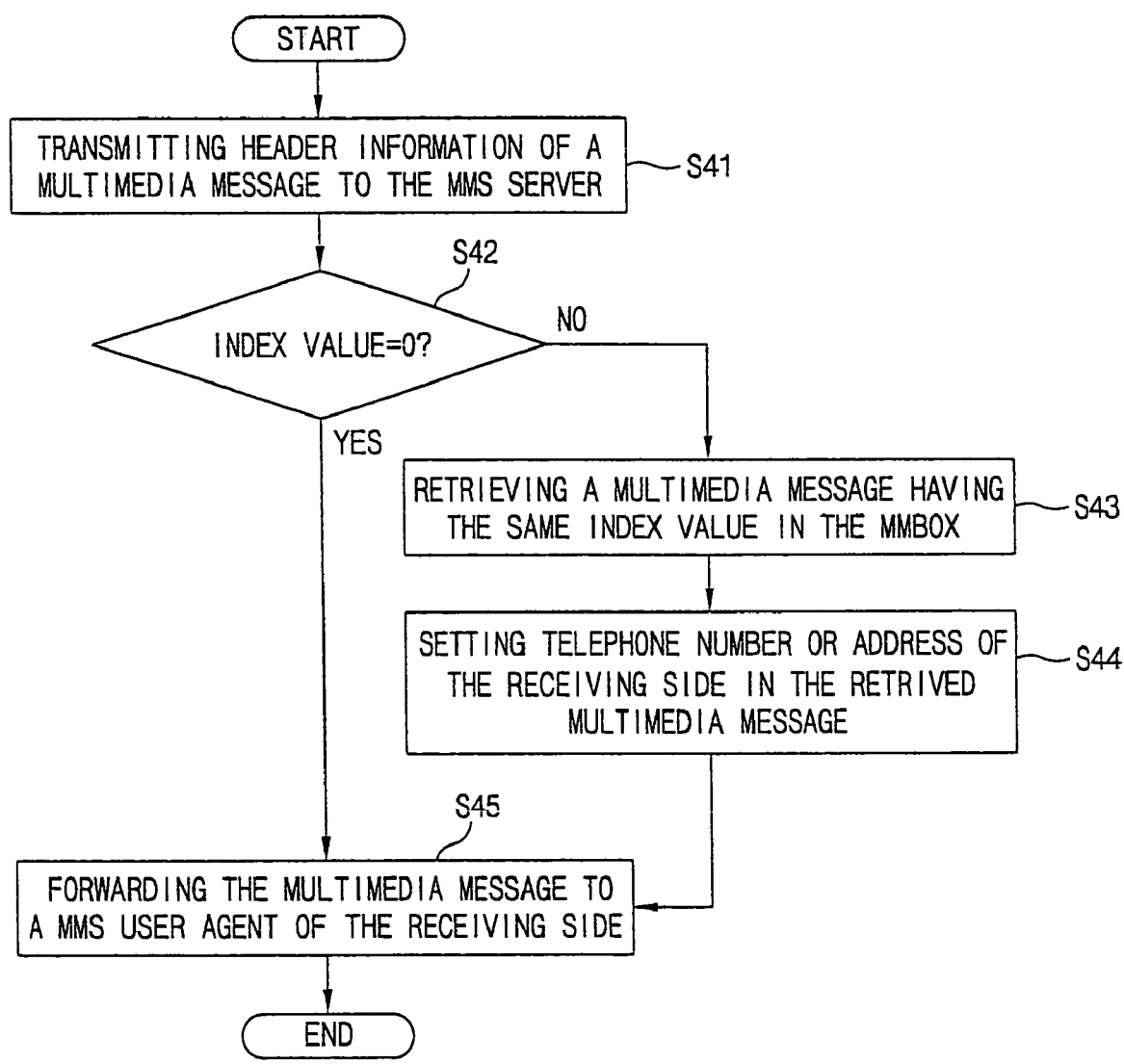

METHOD AND APPARATUS TO FORWARD A MULTIMEDIA MESSAGE

This application claims priority from Korean Patent Application No. 77988/2002, the subject matter of which is incorporated herein by reference.

BACKGROUND OF THE INVENTION

1. Field of the Invention

Embodiments of the present invention may relate to a multimedia messaging service (MMS). More specifically, embodiments of the present invention may relate to forwarding or handling a multimedia message.

2. Background of Related Art

A multimedia messaging service (MMS) is a service upgraded from a short message service (SMS). The MMS can send/receive not only character messages but also various multimedia data such as, but not limited to, moving pictures, music, graphic and pictures, etc. A rapid growth of MMS is expected throughout the world.

In order to forward a multimedia message, it is assumed there is a value added service provider (VASP) or a multimedia message received from a MMS user. That is, in order to forward a multimedia message, a multimedia message may be received from another MMS user.

When a multimedia message consists of image, text and sound, etc., a size of the multimedia message may be comparatively small. However, when a multimedia message includes a moving picture such as MPEG-4 (motion picture experts group-4), h.263, etc., then a size of the multimedia message greatly increases. Accordingly, this involves a greater amount of radio resources/forwarding time.

SUMMARY OF THE INVENTION

Embodiments of the present invention may provide a method for forwarding or handling a multimedia message to reduce an amount of wasted radio resources. This may be accomplished by setting an index value in a multimedia message and forwarding the multimedia message from a MMS server to a MMS user agent based on the set index value.

Embodiments of the present invention may also provide a method for forwarding or handling a multimedia message so as to reduce a forwarding time between a MMS user agent and a MMS server. This may be accomplished by setting an index value in a multimedia message and forwarding the multimedia message based on the set index value.

Embodiments of the present invention may include transmitting header information of a multimedia message from a user agent to a server, and determining an index value of the transmitted header information.

Embodiments of the present invention may include receiving header information of a multimedia message, and determining how to communicate a multimedia message based on the received header information.

Embodiments of the present invention may also include a server having a receiving device to receive at least an index value of a multimedia message, a processor to select information to transmit based on the index value, and a transmitting device to transmit at least the selected information.

Additional advantages, objects, features and embodiments of the invention will be set forth in part in the description which follows and in part will become apparent to those having ordinary skill in the art upon examination of the following or may be learned from practice of the invention.

BRIEF DESCRIPTION OF THE DRAWINGS

The accompanying drawings illustrate various arrangements and embodiments of the invention and together with the description serve to explain the principles of the invention. Arrangements and embodiments will be described in detail with reference to the following drawings in which like reference numerals refer to like elements and wherein:

FIG. 1 is a flow chart illustrating a method of receiving a multimedia message according to one example arrangement;

FIG. 2 is a flow chart illustrating a method of forwarding a multimedia message according to one example arrangement;

FIG. 3 is a flow chart illustrating a method of receiving a multimedia message according to an example embodiment of the present invention; and FIG. 4 is a flow chart illustrating a method of forwarding a multimedia message according to an example embodiment of the present invention.

DETAILED DESCRIPTION OF PREFERRED EMBODIMENTS

FIG. 1 is a flow chart illustrating a method of receiving (or handling) a multimedia message according to an example arrangement. Other arrangements are also possible.

A MMS server may receive a multimedia message from a MMS user agent (i.e., a transmitting side) as shown at block S11. The MMS may have a set storage period. The MMS server may store the received multimedia message in a multimedia message box (MMbox) of the MMS server as shown at block S12. The MMS server may transmit the received multimedia message to a MMS user agent in block S13. When the MMS user agent does not properly or fully receive the multimedia message due to radio failure (or other reason), the MMS user agent may inform the MMS server and the MMS user agent may receive the multimedia message at a later time. More specifically, the MMS server may store the multimedia message in the MMbox for a preset storage period in order to retransmit the multimedia message at a later time.

After the preset storage period has elapsed, the MMS server may automatically delete the stored multimedia message from the MMbox. This may help prevent the multimedia message from being stored twice.

FIG. 2 is a flow chart illustrating a method of forwarding (or handling) a multimedia message according to an example arrangement. Other arrangements are also possible.

In order to forward a received multimedia message, the MMS user agent may insert an address and/or telephone number of a receiving side's MMS user agent into the multimedia message. The multimedia message including the set address and/or telephone number may be forwarded to the MMS server as shown in block S21. In forwarding the multimedia message, the MMS user agent forwards the whole multimedia message including the address and/or telephone number.

The MMS server may store the received multimedia message in the MMbox as shown in block S22. The MMS server may forward the received multimedia message to a receiving-side MMS server (including the MMS user agent) as shown in block S23.

In the above-described multimedia message forwarding method, the multimedia message is forwarded between the MMS user agent and the MMS server. More specifically, the MMS user agent forwards a whole multimedia message to the MMS server. This may waste time because the whole multimedia message is always transmitted from the MMS user agent to the MMS server.

Embodiments of the present invention will now be described with respect to FIGS. 3 and 4. Embodiments of the present invention may reduce the amount of wasted radio resources and forwarding time between a MMS user agent and a MMS server. This may be accomplished by setting an index value in a multimedia message and forwarding the multimedia message based on the set index value.

FIG. 3 is a flow chart illustrating a method of handling (or receiving/processing) a multimedia message according to an example embodiment of the present invention. Other operations, orders of operations and embodiments are also within the scope of the present invention.

A MMS server may receive a multimedia message as shown in block S31. The MMS server may set an index value in a header of the received multimedia message as shown in block S32. The MMS server may store the multimedia message (including the set index value) in an MMbox of the MMS server as shown in block S33. The MMS server may transmit the multimedia message (including the set index value) to a MMS user agent as shown in block S34.

The index value may be a predetermined bit and/or information area added to the multimedia message (or inserted within the multimedia message) in order to discriminate a pertinent multimedia message from other received multimedia messages. The index value may be provided in a header of the multimedia message. An index value may be set to a value other than '0' by the MMS server. A multimedia message having an index value of '0' may correspond to a first-sent multimedia message or to a multimedia message that has had its contents changed in the MMS user agent. Other values are also within the scope of the present invention.

FIG. 4 is a flow chart illustrating a method of handling (or forwarding/processing) a multimedia message according to an example embodiment of the present invention. Other operations, orders of operations and embodiments are also within the scope of the present invention.

FIG. 4 shows operations of forwarding a multimedia message between a MMS user agent and a MMS server. The method may include transmitting header information of a multimedia message (to be transmitted) from the MMS user agent to the MMS server. The method may also include judging whether an index value of the transmitted header information is '0' or another value. When the index value is other than '0' (i.e., corresponding to no change), then a multimedia message having a same index value may be retrieved from a MMbox of the MMS server. A telephone number and/or address of a receiving side may be set in the retrieved multimedia message. The multimedia message, including the receiving side's telephone number or address, having the index value of '0', may be transmitted to a MMS user agent of the receiving side. When the MMS user agent changes the contents of the multimedia message (or it is the first-sent multimedia message), the MMS user agent sets the index value as '0' and forwards the whole multimedia message (having the index value of '0') to the MMS server.

A method of forwarding (or processing) a multimedia message (including a set index value) in accordance with an example embodiment of the present invention will now be described.

When the MMS user agent changes a multimedia message to be forwarded, the MMS user agent sets an index value in the multimedia message to '0'. The whole multimedia message (having the index value of '0') is forwarded to the MMS server. On the other hand, when the MMS user agent does not change the multimedia message to be forwarded, the MMS user agent may only transmit header information of the multimedia message to the MMS server as shown in block S41.

The MMS server judges (or determines) whether an index value of the received multimedia message header is '0' as shown in block S42. When the index value is determined to not be '0', then the MMS server may retrieve a multimedia message having a same index value as shown in block S43. The MMS server may insert a telephone number and/or address of the receiving side in a header (or other part) of the multimedia message as shown in block S44. The MMS server may then forward the multimedia message (including the receiving side's telephone number and/or address) to a MMS user agent on the receiving side as shown in block S45.

On the other hand, when the index value is determined to be '0', then the MMS server may forward the multimedia message having the index value of '0' to the MMS user agent on the receiving side as shown in block S45.

As indicated above, the MMS server may include an MMbox to store multimedia messages as well as information relating to multimedia messages. A multimedia message storing period of the MMbox may be set by the MMS user agent on the transmitting side. Because of the possibility of a stored message being deleted when the multimedia message is forwarded, the MMS user agent may check the multimedia message storing period based on a point in which the received multimedia message was stored in the MMbox. For example, when the multimedia message storing period has elapsed, the MMS user agent (or the MMS server) may change the index value to '0' of the multimedia message to be forwarded.

The MMS server may also include a processor to perform various operations discussed above. This may involve determining how to handle a multimedia message based on an index value in a header (of a multimedia message). For example, the processor may decide to forward a multimedia message as to obtain a stored multimedia message based on the index value. The MMS server may also include a transmitting device to transmit (or forward) information and a receiving device to receive information.

Embodiments of the present invention can reduce the wastage of radio resources between a MMS user agent and a MMS server by setting an index value in a multimedia message and forwarding the multimedia message based on the set index value.

Embodiments of the present invention may reduce a forwarding time between a MMS user agent and a MMS server by setting an index value in a multimedia message and forwarding the multimedia message based on the set index value.

The foregoing embodiments and advantages are merely exemplary and are not to be construed as limiting the present invention. The present teaching can be readily applied to other types of apparatuses and operations. The description of the present invention is intended to be illustrative, and not to limit the scope of the claims. Many alternatives, modifications, and variations will be apparent to those skilled in the art.

What is claimed is:

1. A method comprising:
   receiving a multimedia message from a user agent;
   setting a first index value of the multimedia message, wherein the first index value is set as a value to identify and discriminate the multimedia message from other multimedia messages, the first index value identifying a type of the multimedia message;
   storing the multimedia message having the set first index value in a storage device;
   receiving information including a second index value from the user agent, wherein the second index value is set to a first value that indicates whether a multimedia message to be forwarded is a new multimedia message or a changed multimedia message or is set to a second value that indicates that the multimedia message is a previously sent multimedia message;

searching whether the multimedia message to be forwarded exists in the storage device based on a comparison of the second index value in the information received from the user agent and the first index value set in the stored multimedia message; and forwarding the multimedia message produced by the search, wherein, if a storing time of the multimedia message in the storage device elapses, the second index value is set as a value indicating a new multimedia message even though the multimedia message to be forwarded is a previously sent multimedia message, and wherein:

the information including the second index value corresponds to a multimedia message includes first information and second information, the first information corresponds to header information and includes the second index value and the second information includes contents of the multimedia message, said contents including at least one of text or data, and said receiving includes receiving the header information without the second information of the multimedia message when the second index value corresponds to the second value.

2. The method of claim 1, wherein the first index value is set in a header of the multimedia message.

3. The method of claim 2, wherein the information includes an address or telephone number of the receiving side's user agent and the second message.

4. The method of claim 2, wherein the second index value is set as a value corresponding to '0' when the multimedia message to be forwarded is a new multimedia message or changed.

5. The method of claim 2, wherein the second index value is set as a value corresponding to other than '0' when the multimedia message to be forwarded is a previously sent multimedia message.

6. A method comprising:

transmitting header information of a multimedia message from a user agent to a server, the multimedia message including first information and second information, the first information corresponding to the header information and the second information corresponding contents of the multimedia message, said contents including at least one of text or data, and wherein said transmitting includes transmitting the header information without the second information of the multimedia message; and determining an index value of the transmitted header information, wherein the index value indicates whether the multimedia message is a new multimedia message or a previously sent multimedia message, the index value having a first value when the multimedia message is a new multimedia message or a changed message and a second value when the multimedia message is a previously sent multimedia message;

retrieving a multimedia message having a same index value in a mailbox if the multimedia message is a previously sent multimedia message;

inserting information of a receiving side in the retrieved multimedia message; and transmitting the multimedia message to a user agent on the receiving side, wherein if a storing time of the multimedia message in the mailbox elapses, the index value is set as a value indicating a new multimedia message even though the multimedia message to be forwarded is a previously sent multimedia message.

7. The method of claim 6, wherein the information of the receiving side comprises one of a telephone number or an address of the receiving side.

8. The method of claim 6, wherein the index value in the mailbox includes a predetermined bit to discriminate among multimedia messages.

9. The method of claim 6, further comprising
a multimedia server setting the index value to correspond to a value other than a first value in a mailbox.

10. The method of claim 9, wherein the index value is set as a value corresponding to '0' when the multimedia message is a new multimedia message or a changed message.

11. The method of claim 9, wherein the index value is set as a value corresponding to other than '0' when the multimedia message is a previously sent multimedia message.

12. The method of claim 6, wherein the multimedia message stored in a mailbox has a predetermined storage time set by a multimedia user agent.

13. The method of claim 12, further comprising automatically deleting the multimedia message stored in the mailbox when the set storing time elapses.

14. A server comprising:

a receiving device to receive at least an index value of a multimedia message;

a processor to select information to transmit based on the index value, wherein the index value indicates whether the multimedia message is a new multimedia message or a changed message or a previously received multimedia message, the index value having a first value when the multimedia message is a new multimedia message or changed message and a second value when the multimedia message is a previously sent multimedia message; and a transmitting device to transmit at least the selected information, wherein, if a storing time of the multimedia message stored in the server elapses, the user agent sets the index value as a value indicating a new multimedia message even through the multimedia message is a previously sent multimedia message, and wherein:

the multimedia message includes first information and second information, the first information corresponds to header information and includes the index value and the second information includes contents of the multimedia message, said contents including at least one of text or data, and said transmitting includes transmitting the header information without the second information of the multimedia message when the index value corresponds to the second value.

15. The server of claim 14, wherein the index value comprises a predetermined bit in order to discriminate the multimedia message from other multimedia messages.

16. The server of claim 14, wherein the processor sets the index value to correspond to '0' when contents of the multimedia message is changed.

17. The server of claim 14, wherein the processor sets the index value to correspond to '0' when the multimedia message is deleted from a mailbox.

18. The server of claim 14, wherein the processor decides to forward the multimedia message from a first user agent to a second user agent based on the received index value.

19. The server of claim 14, wherein the processor decides to retrieve a multimedia message having a similar index value from a memory based on the determined index value.

20. A method for processing a multimedia message comprising:
  setting an index value to a first value or a second value; and transmitting:
  (a) the multimedia message including the index value set to the first value, the index value set to the first value transmitted in a header of the multimedia message, wherein the index value set to the first value indicates that the multimedia message is a new multimedia message or a changed multimedia message from a previously sent multimedia message, and
  (b) only a header of a multimedia message when the index value is set to the second value, wherein the index value set to the second value indicates that the multimedia message was a previously sent multimedia message which has not changed; and
  receiving the header in (b) when the index value is set to the second value or the multimedia message in (a) when the index value is set to the first value,
  wherein, when only the header in (b) is received, the method further comprises:
  retrieving the multimedia message having a corresponding index value as the received header from a storage device.

21. The method of claim 20, wherein the index value is set as a '0' when the multimedia message is a new multimedia message or the changed multimedia message.

22. The method of claim 20, wherein the index value is set other than '0' to discriminate among multimedia messages when the multimedia message is the previously sent multimedia message, which has not changed.

23. The method of claim 22, wherein the index value includes a predetermined bit to discriminate among multimedia messages.

24. The method of claim 20, forwarding the retrieved multimedia message or forwarding the received multimedia message.

* * * * *